United States Patent

Pansini

[15] 3,655,054
[45] Apr. 11, 1972

[54] AUTOMATIC CHLORINATOR FOR SWIMMING POOLS

[72] Inventor: Andrew L. Pansini, 27 Larkspur Street, San Rafael, Calif. 94901

[22] Filed: May 25, 1970

[21] Appl. No.: 40,100

[52] U.S. Cl.............................210/169, 23/272.7, 210/206
[51] Int. Cl..............................................................E04h 3/16
[58] Field of Search....................23/272.7, 267; 210/62, 169, 210/206

[56] References Cited

UNITED STATES PATENTS

| 3,185,170 | 5/1965 | Westman | 23/272.7 X |
| 3,386,808 | 6/1968 | Handeland | 23/272.7 |
| 3,426,901 | 2/1969 | Sherper | 210/169 |
| 3,456,801 | 7/1969 | Bowles | 210/169 |

Primary Examiner—S. Leon Bashore
Assistant Examiner—Robert L. Lindsay, Jr.
Attorney—Naylor & Neal

[57] ABSTRACT

An automatic non-electric which employs powdered or granular chlorine in a submerged condition and which is operable in response to deactivation followed by activation of the pump of a swimming pool recirculating and water treatment system to automatically inject a given amount of chlorine into the pool return line. This is accomplished by a by pass system which comprises an air tight reservoir for containing treatment solution, a loop of pipe for storage which bypasses a suction line from a swimming pool.

6 Claims, 8 Drawing Figures

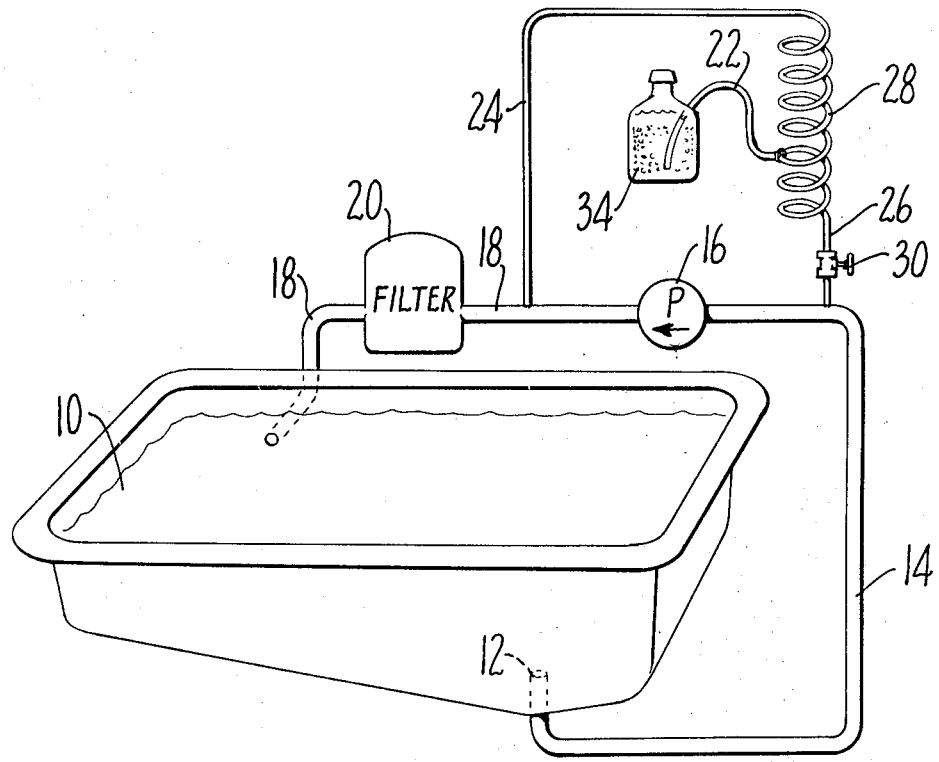
FIG. 1.
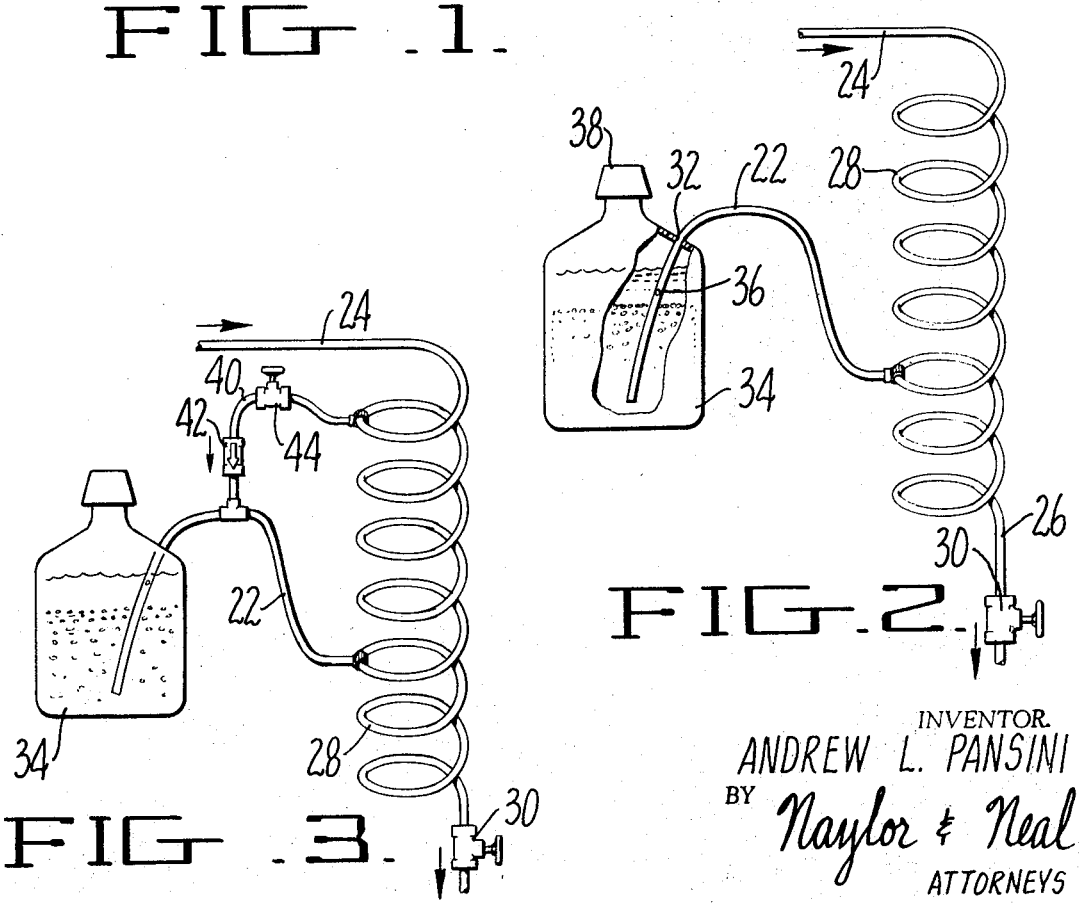
FIG. 2.
FIG. 3.
INVENTOR.
ANDREW L. PANSINI
BY Naylor & Neal
ATTORNEYS

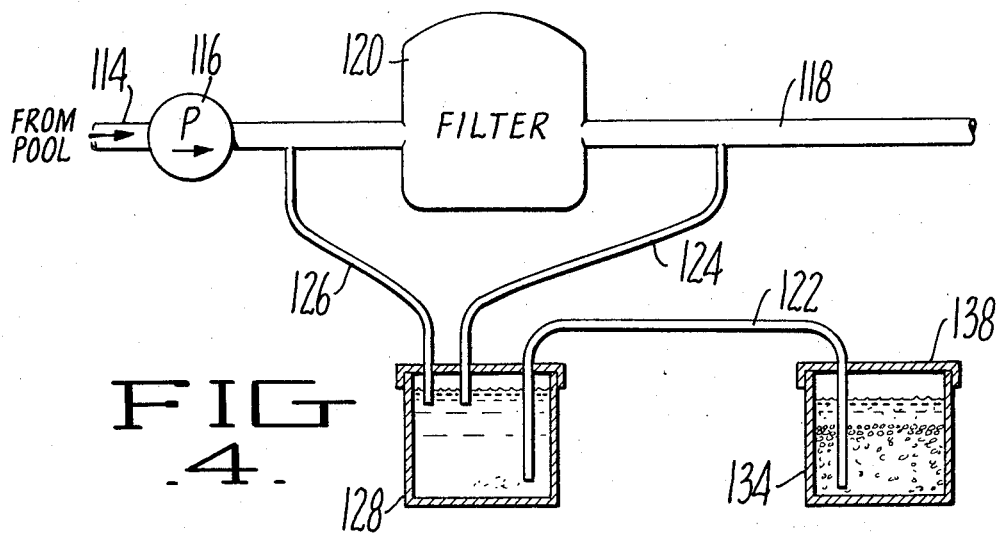
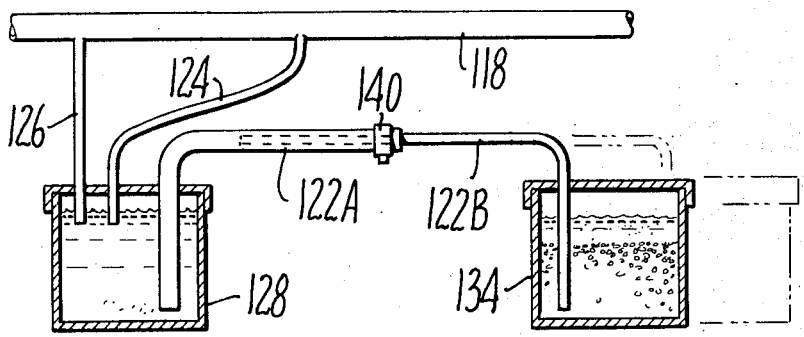
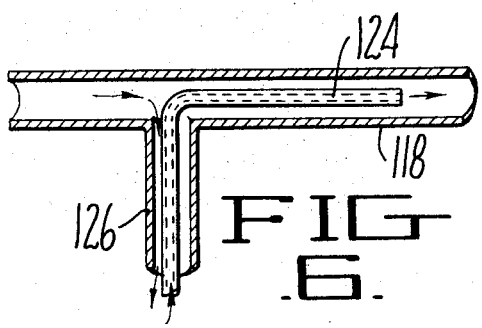
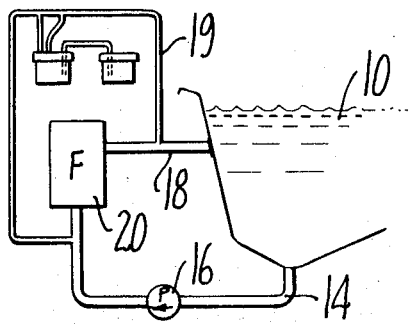
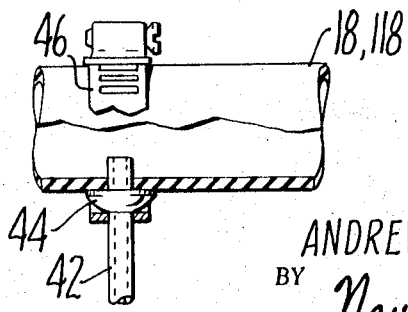

AUTOMATIC CHLORINATOR FOR SWIMMING POOLS

Among the objects and advantages of the invention are the following: to provide a non-electric inexpensive automatic chlorinator for swimming pools; to provide a chlorinator which uses chlorine in its common powdered or granular form, as made by all chemical companies, in a submerged condition; to provide a chlorinator having no injection system to be fouled and no valves to become clogged; to provide a chlorinator system which receives a positive flushing action every time the system is put under pressure, i.e. every time the filter pump is actuated; and to provide a chlorinator adapted to feed a given amount of chlorine into the pool return line over a period of time of controllable length.

These and other objects and advantages of the invention will be apparent from the following description taken in conjunction with the drawings forming part of this specification, and in which:

FIG. 1 is a view essentially schematic in nature, showing a pool in plane view, a pump and filter water recirculation system for the pool, and a preferred form of the automatic chlorinator of the invention in connected relation to the water recirculation system;

FIG. 2 is a semi-schematic view of the preferred chlorinator of the invention;

FIG. 3 is a semi-schematic view of a modified form of the chlorinator of the invention;

FIG. 4 is a semi-schematic view of still a further modified form of the invention;

FIG. 5 is a semi-schematic view of still a further modified form of the invention;

FIG. 6 is a semi-schematic view illustrating a simple form of double connection between the chlorinator of the invention and the pool return line;

FIG. 7 is a semi-schematic view illustrating a manner of positionally connecting the chlorinator of the invention to the pool system when the filter and pump are located below the level of the pool water; and FIG. 8 is a semi-schematic view illustrating a simple adapter system whereby the conduits or tubes of the chlorinator of the invention may be readily connected to the pool return line.

With immediate reference to FIGS. 1 and 2, a swimming pool 10 is provided with a water recirculation and treatment system comprising main drain 12, line 14, which may be termed a suction line, connecting the main drain with the inlet or suction side of pump 16, a return line 18, which may be called a pressure line, interconnecting the outlet or pressure side of the pump 16 with the pool 10. Filter 20 is shown as being in the return line 18 on the pressure side of the pump, but it may also be disposed within the suction line 14, thereby being a suction filter rather than a pressure filter, as shown.

The preferred form of the automatic chlorinator of the invention comprises first, second, and third tubes indicated, respectively, by 22, 24 and 26, a hose 28 of substantial length having one end connected to tube 24 and the other end connected to tube 26 and having a connection intermediate of its length with tube 22. Tube 26 is provided with a valve 30 and has its other end connected to the suction line 14. Tube 24 has its other end connected to line 18 either upstream of, as shown, or downstream of the filter 20. At its point of connection with line 18, tube 24 is provided with a filter screen of relatively fine mesh to prevent dirt from getting into the tube 24. The tube 22 has a water and air-tight connection with reservoir or container 34, the open end of tube 22 being disposed adjacent the bottom thereof. Tube 22 is provided with a small hole 36 disposed about two-thirds of the way up of the length of the tube disposed within container 34. Container 34 is provided with an air-tight cap 38.

The container may be a one gallon glass bottle. It contains about forty ounces of granular chlorine in submerged condition. The storage hose 28 is preferably about 20–25 25 feet in length and is made out of ¾ inch I.D. hose. The smaller tubes 22, 24 and 26 are preferably ¼ inch I.D. plastic tubes.

This chlorinator operates as follows. The valve 30 on suction tube 26 is slightly open in accordance with the amount of chlorine desired to be delivered into the pool circulation system. When the filter system is turned on, i.e. when pump 16 is activated, water is forced into the storage hose 28 and into container 34, raising the solution level by two or three inches until the compressed air in the container equals the pressure force in the system. Water then circulates from pressure line 18 through tube 24, hose 28 and tube 26 to suction line 14. No circulation now occurs in tube 22 or container 34.

When the filter system is shut off the pressurized air or gas in container 34 pushes chlorine solution, again about 2 or 3 inches, out into the storage hose 28 which becomes filled on both sides of the tap connection with tube 22. Very little solution will go towards suction line 14 because of the semi-closed valve 30. Most of the solution will go in the other direction in storage hose 28 and will remain in the storage hose where it will not damage the pool piping system. When the filter system is again turned on the solution in the storage hose 28 between tube 24 and tube 22 will race through tube 22 into the container 34 while the solution within the storage hose 28 between tube 22 and tube 26 will slowly be drawn off into the suction line 14. This of course occurs because when the filter system is turned on the pressure at the point of connection between tube 24 and the main line is greater than the pressure at the point of connection between the tube 26 and the main line. Instead of having the tube 26 connect into the suction line 14 it could connect into the line 18 downstream of the point of connection between tube 24 and line 18, i.e. where the pressure condition is lesser because of pipe resistance or frictional loss.

In practice, it is preferable to make the intake tap for tube 24 directly after the pump 16 and before the filter 20 inasmuch as good pressure is always available at this location even though the filter may be dirty. In this way greater pressure is available, and thereby a greater shot of chlorine solution is available, when the filter is dirty and the pool circulation system is poor. Since in this case dirty water is being taken into the storage hose 20, it is preferable to use a small screen, not shown, at the end of the tube 24 where it connects to the main line. This screen is automatically back-flushed by the pressure in container 34 each time the pump is shut off. This tap between the pump and the filter could not be made if it were not for this back-flushing action.

Prior efforts to provide chlorinators using submerged dry chlorine have been thwarted by clogging of the small valves which were considered to be necessary in the drawing off of small amounts of solution. This problem has been overcome in the chlorinator of the invention by drawing off about ten times more solution than is necessary for any one chlorine shot and then returning nine-tenths or most of it to the storage container. In this way there is a thorough flushing out of the lines and valves each time a chlorine shot is obtained.

The modified form of the chlorinator of the invention shown in FIG. 3 contains, in addition to what is shown in FIG. 2, a tube 40 interconnecting tubes 22 and 24. Tube 40 is provided with a one-way valve 42 and a flow control valve 44. This arrangement is such as to provide a greater chlorine delivery shot than would be obtainable by fully opening valve 30. A controlled amount of fresh water is allowed to race directly into the container 34 through tube 40 ahead of the solution in the upper part of the storage hose 28.

FIG. 4 shows a further modification of the invention. Parts corresponding to those of FIG. 1 are identified by the same reference numerals plus 100. Tubes 122, 124 and 126 are preferably ¼ inch plastic tubes. Containers 128 and 134 may be quart-size glass jars with pressure tight caps. Granular or powdered chlorine is placed in container 134. Container 128, which takes the place of the storage hose 28 in the embodiment of FIGS. 1 and 2, constitutes a temporary holding and mixing chamber.

About 90 percent of filter installations are located above the pool water level. When the pool pump to the filter is shut off the water in the piping tries to seek the level of the pool water, thus creating a partial vacuum condition in the piping system. Tubes 126 and 124 draw water from container 128 which in turn draws chlorine solution from container 134 until a partial vacuum is created sufficient to hold the water in the piping from returning to the pool. Chlorine solution remains in container 128 until the filter system is again turned on. During the next several hours, as water flows through higher pressure tube 126 into container 128 and then back to the pool through tube 124, all of the chlorine is removed from container 128. In the absence of container 128, the chlorine would be in the piping during the off cycle and damage the piping.

The more water that is put into container 134 when the chlorine is placed therein the less will be the flow of liquid from container 134 to container 128 when the system is placed under suction, i.e. when the pump is turned off. In practice, container 134 is usually filled to about one-half full of chlorine. Then the top 138 is screwed onto the container loosely, followed by activation of pump 116. As water rises to the desired level in container 134, cap 138 is tightened. If more chlorine is desired than can be obtained from container 134 in one shut down of the filter system, then the filter system may be shut down two or more times during each 24 hour period.

Chlorine is gradually fed into the system during a several hour period from the mixed solution in container 128. This period can be controlled if desired by incorporating a valve in tube 126 or tube 124 or by positioning tubes 126 and 124 either closer together or farther apart where they tap into the return line to the pool.

The amount of chlorine that is dispensed into the pool system is not affected by the filter 120 being dirty and having a resultant reduced flow rate. The amount of chlorine dispensed is constant every day regardless of the flow rate, i.e. the flow from container 134 to container 128 under the suction or pump-off condition remains constant regardless of the condition of the filter.

FIG. 5 illustrates a modification of the embodiment of FIG. 4. Here, tube 122 is formed to telescoping sections 122A and 122B adapted to be secured together by clamp 140, the overall arrangement being such that the length of the tube 122 can be varied to enable a control of the amount of chlorine concentrate drawn into container 128 from container 134. Since all the chlorine that remains in tube 122 is flushed back into container 134 when the pump is again turned on, it will be seen that the shorter the tube 122 the more chlorine will be drawn into container 128.

FIG. 6 illustrates how the two tubes 126 and 124 of FIG. 4 could be replaced by one tube loosely placed inside a larger tube, thus requiring only one point of tap into the return line. The farther the end of the small tube 124 is placed downstream from the point of connection between return line 118 and tube 126, the greater the flow into and out of container 128.

In a small percentage of pool installations, the filters and pumps are disposed below the level of the pool water. This is illustrated in FIG. 7 where elements corresponding to those shown in FIG. 1 are identified by the same reference numerals. To enable the automatic chlorinator of the invention to be employed in such a pool system, the return line 18 is provided with a raised portion 19 which is disposed above the level of the pool water, and the automatic chlorinator is tapped into the raised portion 19.

FIG. 8 illustrates a simple adapter system whereby the tubes, such as 24 and 26, 124 and 126, can be connected to the return line 18 or 118. A small hole is drilled in the return line and into this hole there is inserted a short piece of copper or hard plastic tubing 42. A soft washer 44 is placed around the tubing 42 and a strap clamp 46, provided with a hold to receive the tubing 42, serves to clamp the tubing in place. A tube such as 24 or 26 is then forced over the short length of tubing 42.

What is claimed is:

1. In a swimming pool water treatment system including conduit means to circulate water out of and into a pool, pump means to circulate the water, and means to activate and deactivate the pump means, the improvement comprising water treatment means operable in response to deactivation followed by activation of the pump means to automatically inject a water treatment solution into said conduit means for transfer to the pool by the pump means, said water treatment means comprising an air-tight reservoir containing a water treatment solution and an air cushion, storage means, a first tube having one end in flow communication with the reservoir and the other end in flow communication with the storage means, a second tube interconnecting the storage means with the conduit means at a first station, a third tube interconnecting the storage means with the conduit means at a second station, the pressure at the first station being in excess of that at the second station during the activation condition of the pump means.

2. The improvement of claim 1, the storage means comprising an elongated hose.

3. The improvement of claim 1 including flow control means operable to allow more water treatment solution within said storage means to return to said reservoir than to pass into said conduit means upon activation of said pump means.

4. The improvement of claim 2, the first tube communicating with the solution within the reservoir at a level adjacent to but below the level of the surface of the solution during activation of the pump means, whereby the amount of solution delivered into the hose upon deactivation of the pump means is limited to the volume of solution between said levels.

5. The improvement of claim 1, including means rendering the first tube variable in length to control the amount of water treatment solution passing from the reservoir into the storage means upon deactivation of the pump.

6. The improvement of claim 1, said storage means comprising an air-tight container.

* * * * *